A. KLAUS.
Seed-Planter.
No. 25,835. Patented Oct. 18, 1859.
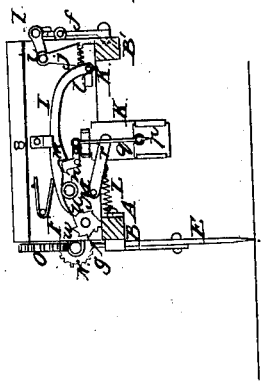
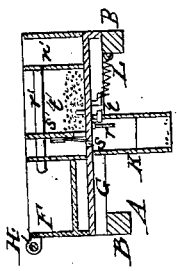
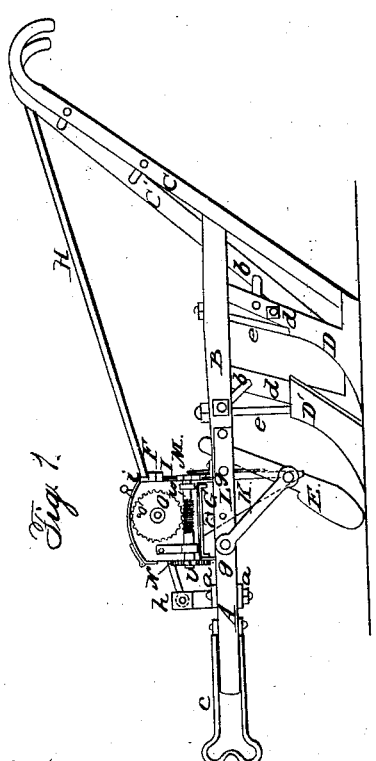
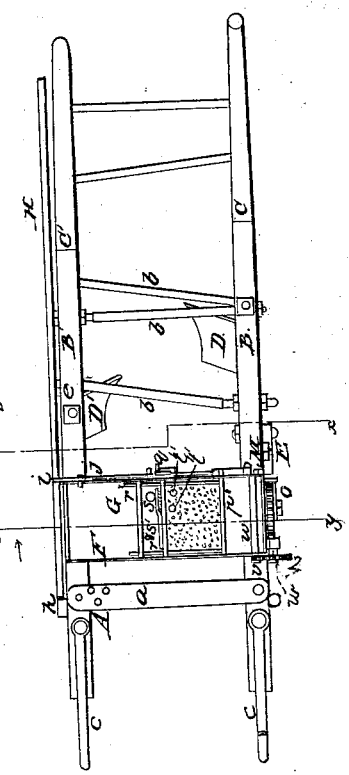

UNITED STATES PATENT OFFICE.

ADAM KLAUS, OF BELLEVILLE, ILLINOIS.

IMPROVEMENT IN SEED-PLANTERS.

Specification forming part of Letters Patent No. 25,835, dated October 18, 1859.

*To all whom it may concern:*

Be it known that I, ADAM KLAUS, of Belleville, in the county of St. Clair and State of Illinois, have invented a new and Improved Seed-Planter; and I do hereby declare that the following is a full, clear, and exact description of the same, reference being had to the accompanying drawings, forming a part of this specification, in which—

Figure 1 represents a side elevation of my invention. Fig. 2 is a plan or top view of the same. Fig. 3 is a transverse vertical section of the same, taken in the plane indicated by the line $x\,x$, Fig. 2, and looking in the direction of the arrow opposite to that line. Fig. 4 is a similar section taken in the line $y\,y$, Fig. 2, and looking in the direction of the arrow opposite to that line.

Similar letters in all the figures refer to corresponding parts.

This invention consists in arranging the dropping apparatus in a particular manner by means of a valve and a sliding door, which are both operated simultaneously with the seed-slide, so that always one throw of seed or corn is kept in store in the lower part of the discharge-tube, ready to drop as soon as the sliding door opens.

To enable those skilled in the art to make and use my invention, I will proceed to describe it.

The frame A of my planter is constructed of two beams, B B', which are united in front by cross-bars $a$ and in the rear by screw-rods $b$ in such a manner that they can be brought closer to or farther from each other, as occasion may require. Secured to the front end of each beam is a clevis, $c$, to which the draft-animal is hitched, and each of the beams is furnished on its rear end with a handle, C C', which serve to govern the machine in the usual manner.

The plowshares D D' are secured to the beams by means of standards $d$ and screw-rods $e$, and the share D' on the beam B' is slightly in advance of the other share, D, and both are curved, so that the corn as it drops between them is covered up, and that a small furrow is left on each side of the same, so that not only the corn is not so liable to be scratched out by the birds, but its growth is materially promoted. If, as is usually done, the corn is planted in a furrow, it is drowned by each heavy rain, especially in low prairie lands, or a hard crust forms on the surface of the ground where the corn is deposited, so that it is difficult for the germ to push through; and if the corn is planted with my machine the first plowing after the planting can be done much earlier and to a better advantage. If the young plants are in a furrow and the plow passes by them, they are very liable to get covered up, and for this reason it is necessary to wait until the young crop has attained a certain height. With my machine the young plants are placed on small ridges, and plows passing through between them have no injurious influence on the same. Furthermore, my machine is so arranged that the plows can be used in combination with the hopper-box, or that each plow can be used separately for the purpose of weeding. By this arrangement an extra outlay of money for weeding-plows is saved.

A correct motion of my planter is insured by means of a cutter, E, placed in front of the share D. This cutter is secured to the side of the beam B, and it serves to keep the direction of the plow straight and to prevent the shares from running too deep, as the corn needs only a slight covering. Without this cutter the plows, on account of their oblique position, would have a tendency to throw the planter off from its straight course.

The hopper-box F is secured to the frame A by means of a hook, $f$, (see Fig. 3,) and it is kept in its place by studs $g$, secured to the upper surface of the beams B B'. The bottom G of the hopper forms the seed-slide, which is operated by means of a hand-lever, H, that is pivoted to a standard, $h$, and which extends back to the handle C'. Said lever passes through the end of one arm, $i$, of a crank-lever, $i\,j$, the other arm, $j$, of which forms a toothed sector, that gears into a rack, $k$, which is fastened to the side of the seed-slide. The rack $k$ connects by means of a pivot, $l$, with a pawl, I, that has the double function of controlling the discharge of the seed and of operating the registering apparatus. The connection between said pawl and the discharge-tube K is formed by a shoulder, $m$, on the under side of the pawl. This shoulder strikes against a crank-lever, $n\,o$, which is pivoted to the side of the hopper-box. One of the arms, $o$, of said crank-lever connects with a sliding door, *p*, at the lower end of the discharge-tube by means of a rod or chain, *q*, so that whenever the lever H is depressed and the seed-slide thrown forward the sliding door *p* is raised and the contents of the discharge-tube dropped on the ground.

A valve, *r*, Fig. 4, is hinged to the lower side of the seed-slide, close behind the seed-cell *s*, and a pin, *t*, is secured to the upper edge of the discharge-tube in such a position that said valve, by striking against the pin *t*, turns up and closes the seed-cell whenever the seed-slide is thrown forward. By this arrangement the kernels are retained in the seed-cell until the hand on the lever H relaxes, and the seed-slide, by the action of a spiral spring, L, assumes its original position; and as the sliding door *p* is raised only when the seed-slide is thrown forward the seed or corn is not discharged from the seed-cell until said door is closed, so that one throw of corn is always kept on hand in the lower part of the discharge-tube. This tube may be prolonged nearly down to the ground, so that the corn has to fall over a small height only, and that the dropping is done much more accurate than with such seed-planters where the seed is discharged directly from the seed-slide.

The discharge-tube K is hinged to the hopper-box, and it is sustained in its position by means of a spring, *r'*. If it strikes against a stump or other obstruction, it yields, and it passes over the same without injury.

In order to insure a correct filling of the seed-cell at all times and independent from the quantity of seed in the hopper-box, said box is furnished with a partition, *p'*, which slides by means of two rods, *r\* r\**, to and from the central partition, *s'*, and two or more pins, *t'*, on the upper surface of the seed-slide serve to agitate the corn. By properly adjusting said sliding partition the corn or seed in the hopper-box can be made to discharge correctly to the last kernel. When the seed-slide is thrown forward the pawl I turns a ratchet-wheel, M, one tooth for each throw of the slide. This wheel is secured to one end of an arbor, *u*, the other end of which carries a pinion, *v*, that gears in a cog-wheel, N, from which motion is communicated by means of an endless screw, *w*, to the index-wheel O. A mark, *o'*, on the face of this wheel serves as the index, and the number of the teeth on the several wheels is such that the wheel O makes just one revolution for each two thousand one hundred and forty-six strokes of the seed-slide, and if the hills are placed four and a half feet apart this number will exactly fill one acre. It is obvious, however, that a regular index-hand might be secured to the arbor of said wheel, and a dial-plate might be marked and arranged in such manner that the number of strokes of the seed-slide could be ascertained whenever desired.

I am aware that check-valves have been introduced in the bottom of the discharge-tubes of seed-planters in various ways. I do not claim, therefore, the use of such independent from my other arrangement; but

I claim—

The valve *r*, in combination with the sliding door *p*, when the same are operated simultaneously with the seed-slide, substantially in the manner and for the purpose described.

ADAM KLAUS.

Witnesses:
GEORGE HOFMEISTER,
ADAM AULBACH.